United States Patent

[11] 3,546,396

[72] Inventors Henry Marcheschi
Los Angeles;
George D. Perkins, Pasadena, California
[21] Appl. No. 654,778
[22] Filed July 20, 1967
[45] Patented Dec. 8, 1970
[73] Assignee American Telecommunication Corporation
Los Angeles, California
a corporation of California

[54] ENCLOSED TELEPHONE HAVING A RACEWAY FOR ITS CORD
9 Claims, 3 Drawing Figs.

[52] U.S. Cl. .......... 179/100, 179/178; 191/124; 174/69
[51] Int. Cl. .......... H04m 1/02
[50] Field of Search .......... 179/100(D) 178, 179, 184, 186, 154, 155, 95; 191/12; 174/69; 24/115

[56] References Cited
UNITED STATES PATENTS

| | | | |
|---|---|---|---|
| 2,607,863 | 8/1952 | MacFarland .......... | 174/69 |
| 3,227,802 | 1/1966 | Pressley Jr. .......... | 174/69 |
| 3,373,954 | 3/1968 | Hilsinger Jr. .......... | 191/12 |
| 3,384,718 | 5/1968 | Wilder .......... | 179/100 |

FOREIGN PATENTS

| | | | |
|---|---|---|---|
| 809,563 | 2/1959 | England .......... | 174/72 |

*Primary Examiner*—Kathleen H. Claffy
*Assistant Examiner*—Jan S. Black
*Attorney*—Christie, Parker & Hale

ABSTRACT: A base is provided for mounting the telephone's chassis. A boxlike enclosure which includes a cover plate is mounted on the base over the chassis. One end of a conventional coiled telephone cord is connected to the chassis and the other end to a receiver. The receiver may be nested in indentations in the cover. A raceway within the enclosure houses the cord. The raceway terminates at one end at an outlet through which the cord extends for its connection to the receiver. The configuration of the raceway is such that the cord automatically retracts into it when the phone is not in service. A low-friction actuating mechanism energizes and deenergizes the receiver and transmitter portion of the chassis. A lid is secured by a hinge to the enclosure to cover the outlet, the receiver, and a telephone dial mounted in the cover.

INVENTORS.
HENRY MARCHESCHI
GEORGE D. PERKINS.
BY Christie, Parker & Hale
ATTORNEYS.

INVENTORS.
HENRY MARCHESCHI
BY GEORGE D. PERKINS
Christie, Parker & Hale
ATTORNEYS.

INVENTORS.
HENRY MARCHESCHI
GEORGE D. PERKINS
BY Christie, Parker & Hale
ATTORNEYS.

ENCLOSED TELEPHONE HAVING A RACEWAY FOR ITS CORD

BACKGROUND OF THE INVENTION

1. Field of the Invention

This invention relates to telephone sets and, more particularly, to an enclosure for a telephone's receiver and transmitter which is adapted to automatically retract a coiled telephone cord.

2. State of the Prior Art

Telephones are obviously in extensive use in all walks of life. Despite their abundance, presently available telephones exhibit shortcomings which do not assure trouble-free operation.

More particularly, the telephone cord which connects the receiver to the chassis hangs loosely about the telephone. As a consequence, persons and objects frequently become entangled with the cord causing damage to it as well as the telephone. For example, an inadvertent pull on the cord may cause the telephone to fall from its support. Moreover, there is always a danger that the receiver may be left off the hook thereby leaving the receiver and transmitter energized and making it impossible to receive outside calls. These problems arise even though telephone cords are coiled such that they retract into a shorter length when not in use.

To reduce the hazards presented by having the telephone cord hanging loosely between the telephone set and the receiver, spring wound takeup reels have been provided. These reels retract the cords to within the telephones set's enclosure. Takeup reels are, however, costly and therefore have not come into widespread use.

Another shortcoming of prior art telephone sets is that receivers must be placed exactly into the receptacle provided for them to deenergize the receiver and transmitter. MOreover, the components of the telephones, such as the receiver and the dialer, cannot be effectively covered creating a condition where infants are invited to tamper with the sets. In addition, the esthetic appearance of telephone sets cannot, at the present, be altered and adapted to often greatly divergent surroundings in an economically feasible manner.

SUMMARY OF THE INVENTION

Briefly, a telephone set constructed in accordance with the present invention includes a base which is adapted to receive telephone receiving and transmitting means and an enclosure. The enclosure is adapted to receive a retracted length of helically coiled telephone cord having an end connected with the means. The enclosure is provided with an outlet defining a passage having a smallest diameter greater than a greatest diameter of the coiled cord. A raceway is disposed inside the enclosure and has a length about equal to the retracted length of the cord. The raceway defines a smooth, unobstructed passageway for the cord and is joined to the outlet. The cord is thereby freely pulled out of the raceway through the outlet and automatically retracts into the raceway upon being released. A receiver is adapted to be secured to the other end of the cord and actuates means for energizing and deenergizing the receiving and transmitting means in response to removing the receiver from and placing it on the enclosure. The enclosure is further adapted to receive dialing means which are operatively connected with the receiving and transmitting means for dialing telephone numbers.

Preferably, the set includes as a part of the base a bottom plate demountably secured to the enclosure. The bottom plate defines the floor of the raceway such that the raceway and cord are accessible from the exterior of the set. The installation of the cord in the raceway is thereby facilitated. In a presently preferred embodiment of this invention, the enclosure includes indentations configured such that the receiver neatly nests in the indentations. The receiving and transmitting means are deenergized when the receiver is so nested. The indentations are disposed adjacent an inclined surface such that gravity slides the receiver into the indentations should it be misplaced. The set is thereby capable of receiving outside calls even without having the receiver placed accurately on the set, as was required in the past. A lid is furthermore hingeably secured to the enclosure to cover the receiver and the dialing means while the set is not in use. With the lid or cover the components of the set are not only prevented from becoming soiled, but also from being tampered with by infants. The lid can be provided with a lock to prevent the unauthorized use of the telephone.

The telephone set retracts the coiled cord into the raceway of the enclosure each time the receiver is replaced. Cords hanging loosely about the set can therefore no longer be accidentally engaged by a person. Damage to both the cord and the set is substantially reduced or eliminated. Moreover, the cord is retracted without the need for expensive takeup reels. Since it relies on the spring force of the coiled cord to retract it, mechanically cooperating parts, which need periodic service and replacement, are eliminated. Thus, the cord is retracted and safeguarded without appreciably increasing the manufacturing costs for the set.

The enclosure can be constructed of a variety of materials and can be provided with ornamental designs and shapes. It is thereby readily adapted for use in different applications and surroundings.

DESCRIPTION OF THE PREFERRED EMBODIMENTS

Figure 1:
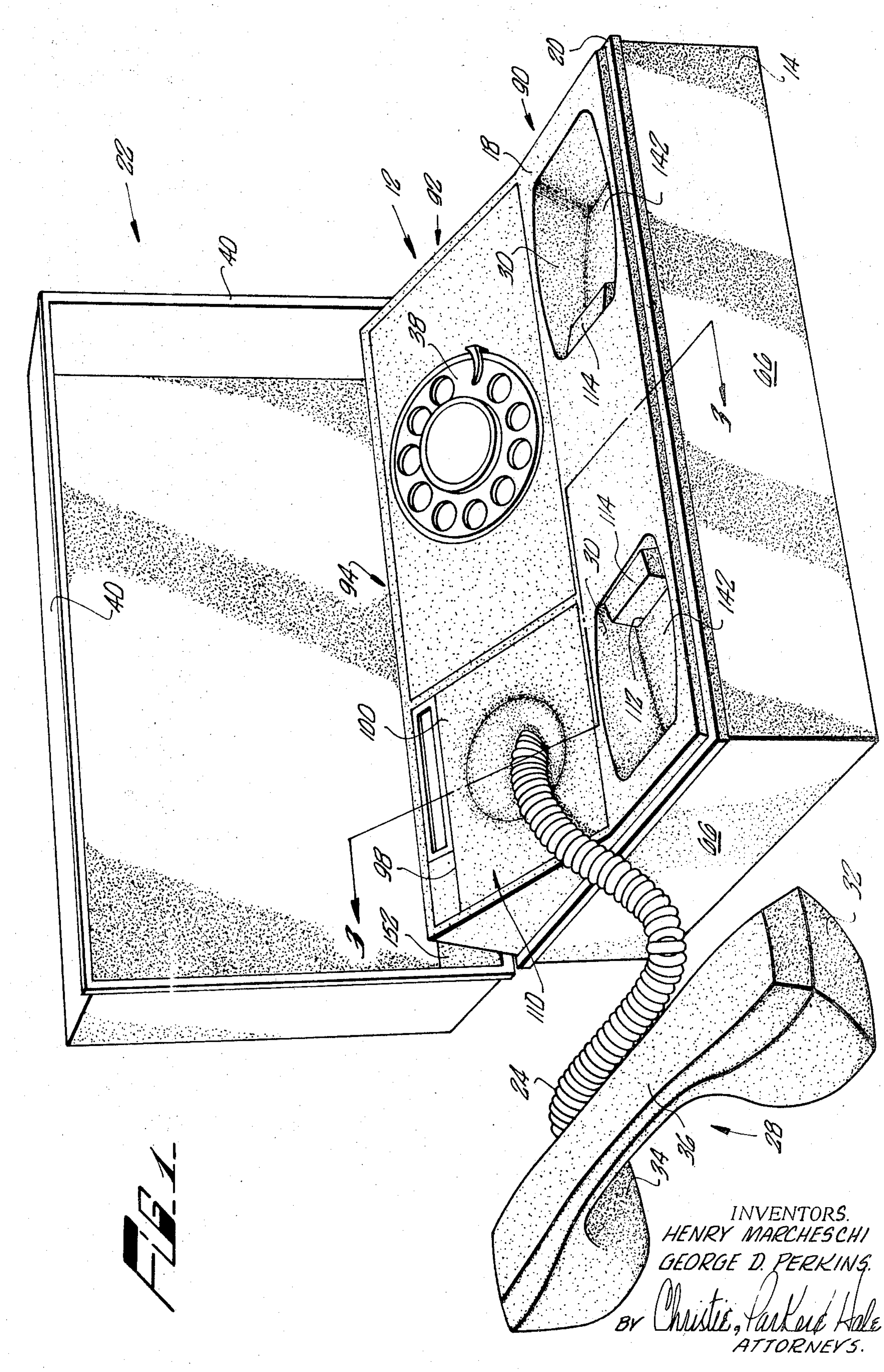
FIG. 1 is an elevational, perspective view of a telephone set constructed in accordance with the present invention.
Figure 2:
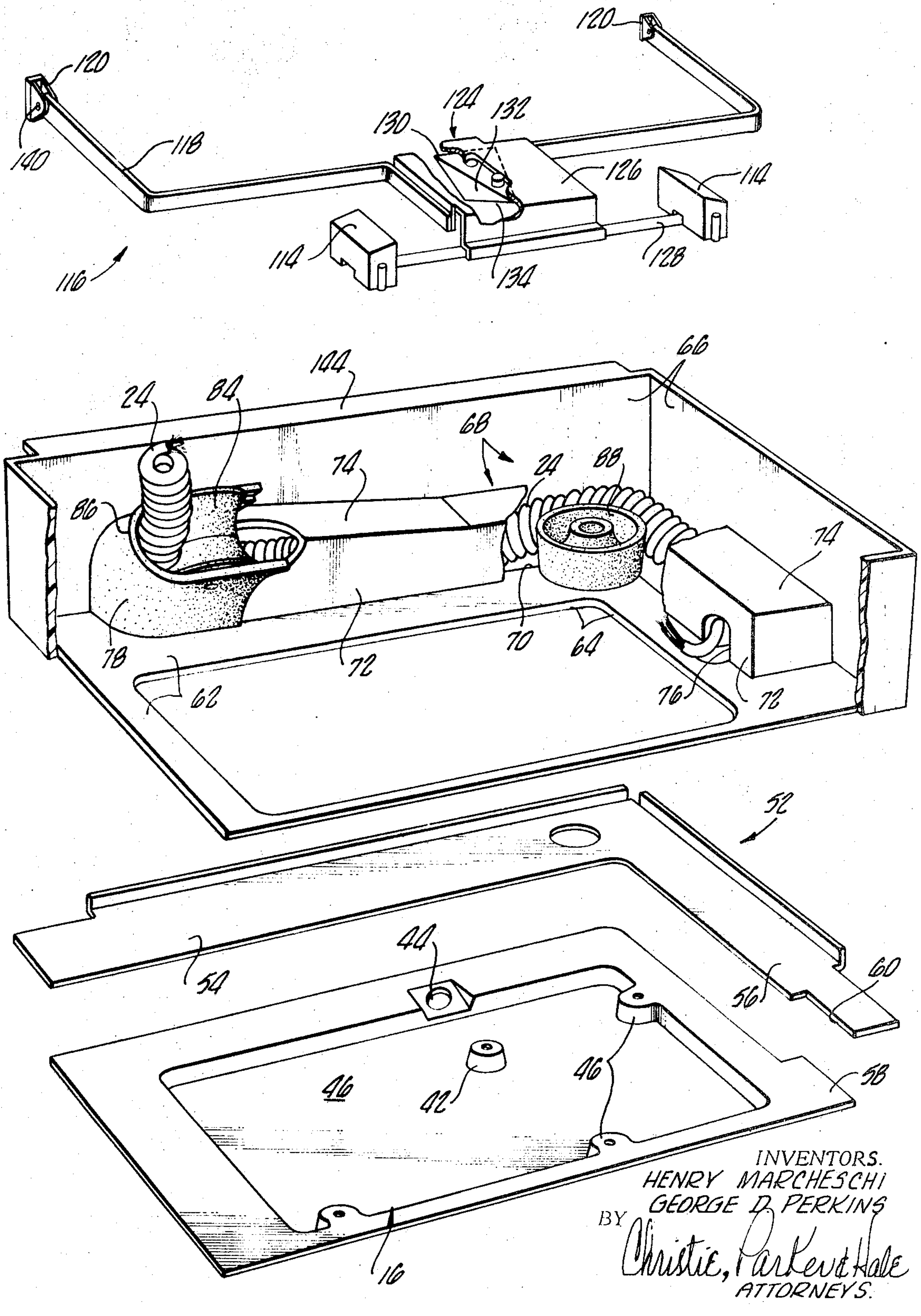
FIG. 2 is a fragmentary, exploded perspective view of the set shown in FIG. 1.

FIG. 1 illustrates a telephone set 12 which includes an enclosure 14 mounted on a base 16, the latter being shown in FIG. 2, a cover 18 secured to a top 20 of the enclosure and a lid 22 hingeably secured to a side of the enclosure. One end of a conventional helically coiled telephone cord 24 is suitably connected with conventional telephone receiving and transmitting means 26, shown in FIG. 3, and another end with a telephone receiver 28. The cover includes a pair of laterally spaced indentations 30 for respectively nesting an earpiece 32 and a mouthpiece 34 of the receiver which are integrally constructed with a handle 36. Also mounted on the cover 18 is a conventional telephone dialer 38 which is operatively connected with the receiving and transmitting means 26. The lid can be closed such that its sides 40 are positioned adjacent the top 20 of the enclosure 14 and the receiver, the coiled cord, the dialer and the cover are disposed within a box defined by the enclosure and the lid. A conventional lock (not shown) can be provided to lock the lid to the enclosure and prevent the unauthorized use of the telephone.

Referring to FIG. 2, the base 16 has a rectangular configuration and includes a plurality of mounting bosses 42 arranged to correspond to mounting holes (not shown) disposed in the telephone receiving and transmitting means 26 to receive screws (not shown) for securing the receiving means to the base. A cord (not shown) connects the receiving means 26 with a suitable wall receptacle (not shown) and extends through a preferably grommeted aperture 44 in the base. A portion 46 of the base is recessed to facilitate the mounting of the receiving means 26 and to reduce the overall height of the telephone set. A plurality of mounting feet 48 (shown in FIG. 3) are further secured to the base for placing the base onto a supporting surface 50 in a spaced-apart relationship.

A substantially L-shaped bottom plate 52 has a long leg 54 about equal to a length of a long side of the base and a short leg 56 equal to a width of the base such that it can be placed adjacent contiguous sides of the base. To facilitate the nesting of the bottom plate to the base, a side of the base includes a protrusion 58 and a corresponding leg of the bottom plate includes a recess 60. Protrusion 58 mates with recess 60.

The enclosure 14 has a rectangular configuration similar to that of the base 16 and includes a bottom 62 having a cutout 64 capable of being slipped over the receiving and transmitting means 26 secured to the base. The enclosure further includes sides 66 originating at the bottom 62 and terminating at the top 20 of the enclosure. A raceway 68 has a length substantially equal to a length of the retracted coiled telephone cord 24 such that the full length of the cord can be placed in the raceway and is preferably disposed adjacent a pair of contiguous sides of the enclosure. The bottom 62 of the enclosure, moreover, includes an elongated cutout 70 adjacent the raceway such that the L-shaped bottom plate 52 defines the floor of the raceway. Other sides of the raceway are defined by upwardly extending walls 72 projecting from the bottom 62 towards the top 20 of the enclosure and substantially horizontal walls 74 intermediate sides 66 of the enclosure walls 72. A fourth side of the raceway is defined by a portion of sidewalls 66 adjacent the raceway intermediate the bottom plate 52 of the base and the horizontal walls 74. The vertical wall 72 includes an aperture 76 adjacent one end of the raceway and another end of the raceway is joined with a preferably removable, horseshoe-shaped connector 78.

Figure 3:
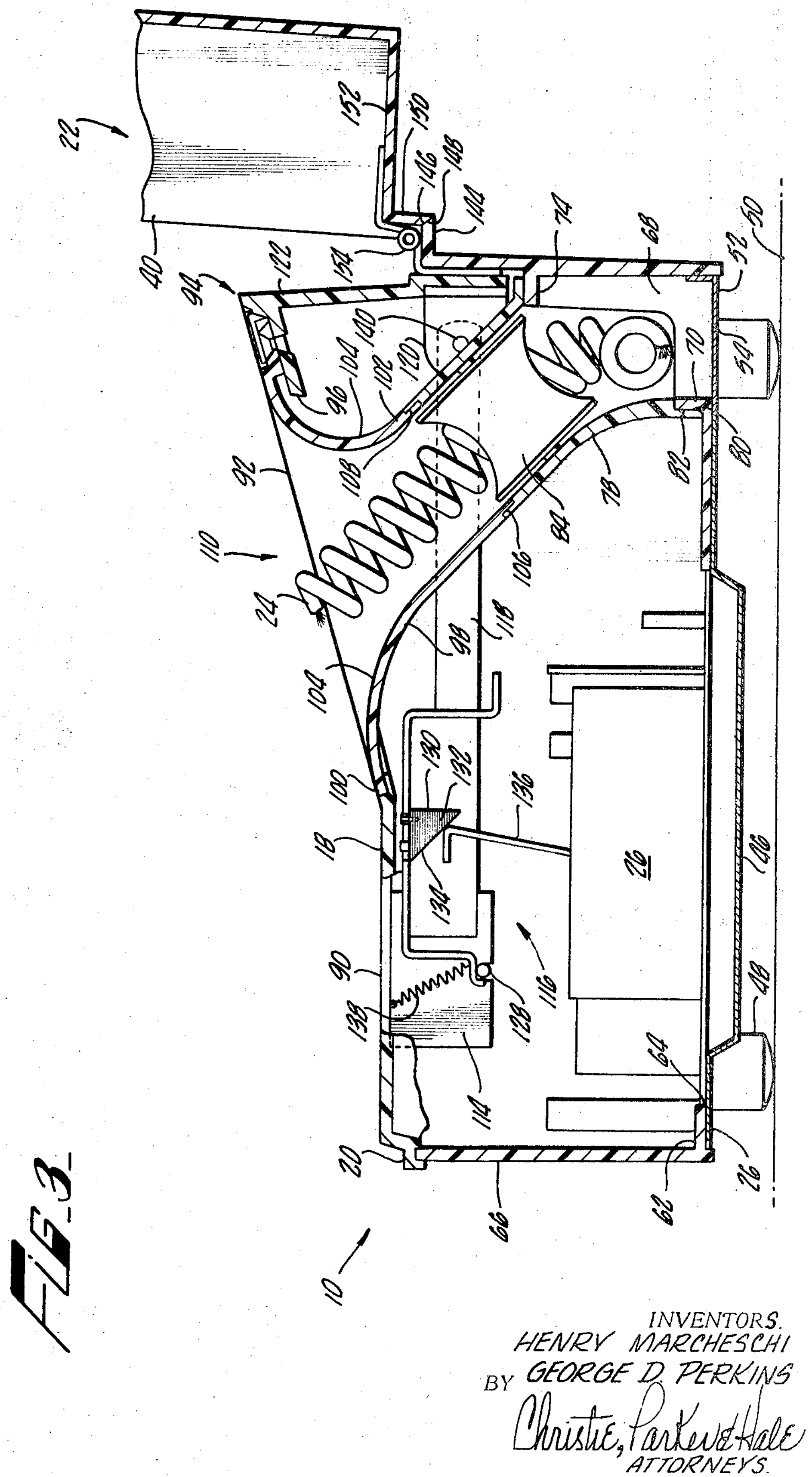
FIG. 3 is a side elevational view, in section, taken along lines 3—3 of FIG. 1.

Referring briefly to FIG. 3, the connector includes a recessed end 80 adapted to be slipped over protrusion 82 projecting upwardly from bottom 62 adjacent the cutout 70 and one of the ends of the raceway. The connector, preferably constructed of a resilient material, such as plastic, frictionally engages the protrusion whereby it is secured to the enclosure 14.

The connector 78 is provided with a rotatably mounted pulley 84 which has a preferably concave periphery. Together with an arcuate end 86 of the connector it defines a substantially round aperture (not shown). Another pulley 88 is rotatably secured adjacent a corner defined by contiguous vertical walls 72 which project into the raceway 68 and is rotatably mounted on bottom 62 of the enclosure. It defines a rounded corner intermediate the contiguous sides.

Referring specifically to FIG. 3, the cover 18 defines a first portion 90 adjacent the indentations 30 which is substantially parallel to the base 16 and a second portion 92 which slopes downwardly from an end 94 of the cover adjacent lid 22 towards the first portion. The downwardly sloped portion of the cover is disposed adjacent the sides 66 of the enclosure defining the raceway 68 and includes a cutout 96 for receiving and mounting a mouthpiece 98.

The mouthpiece defines a substantially planar flange 100, a tubular portion 102 disposed adjacent connector 78 and an outwardly flared transitional section 104 intermediate the tubular portion and the planar flange. The tubular portion includes a recess 106 mating with a corresponding recess 108 in the upper end of the connector such that the mouthpiece engages the connector, is in frictional engagement with the connector, and provides a smooth and unobstructed passageway between the mouthpiece and the connector. The mouthpiece thereby defines an outwardly flared outlet 110 which connects the exterior of the enclosure 14 and cover 18 with the raceway 68.

The second portion 92 of the cover 18 adjacent the mouthpiece 98 additionally includes a cutout (not shown) for receiving and mounting the dial 38 of the telephone set. Apertures 112 adjacent the indentations 30 slidably receive actuating caps 114 which engage the ear and mouthpieces 32 and 34 respectively. When the receiver is placed into the indentations the actuating caps are depressed.

Referring to FIGS. 2 and 3, a telephone receiving and transmitting means actuating mechanism 116 is shown to comprise a substantially C-shaped hinge bar 118 which is pivotally secured to a pair of laterally spaced hinge brackets 120 mounted on an upwardly extending rear wall 122 of cover 18. A center portion 124 of the hinge bar includes a mounting clip 126 which connects a traverse bar 128 to the hinge bar. Ends of the traverse bar are in engagement with the actuating caps 114 projecting through apertures 112 into the indentations 30. The mounting clip further includes a downwardly extending actuating button 130 having a pair of angularly inclined surfaces 132 which diverge in a knife edge 134. The knife edge is angularly inclined from the vertical and engages an edge of a lever 136 pivotally mounted in the receiving and transmitting means 26. The lever energizes the receiving and transmitting means when it is pivoted in a clockwise direction (as viewed in FIG. 3) and deenergizes the means when it is pivoted in a counterclockwise direction.

One end of a tension spring 138 is suitably secured to an inner side of cover 18 and another end to the mounting clip 126 of the hinge bar 118. It biases the hinge bar in a clockwise direction (as viewed in FIG. 3) about a pivot pin 140 secured to the hinge bracket 120 and the actuating caps 114, together with traverse bar 128 and the mounting clip toward the first portion 90 of the cover. The actuating caps 114 are thereby biased upwardly through aperture 112 into the indentation 30 of the cover 18. The spring 138 is constructed such that the weight of the receiver, when the receiver is placed into the indentations and engages the actuating caps 114, exerts a greater downward force onto the actuating caps than the upward force exerted by the spring. This pivots the hinge bar in a counterclockwise direction (as viewed in FIG. 3) when the receiver is placed into the indentations until the receiver contacts a bottom 142 of the indentations. The angularly inclined knife edge of the actuating button 130 thereby pivots the lever 136 of the transmitting and receiving means 26 in a counterclockwise direction. When the receiver is removed from the indentations the knife edge moves upwardly, thereby permitting lever 136 to pivot clockwise to energize the means 26. Conversely, the receiving means are deenergized in response to placement of the reciever in the indentations.

Since the receiver is of relatively light weight, weighing no more than a few ounces, it is important to minimize the friction between the actuating button and the lever 136 of the transmitting means 26. It is therefore particularly advantageous to provide the actuating button with a knife edge which minimizes frictional forces between the actuating button and the lever when the two move relative to each other in response to pivotal movements of the hinge bar.

A side 66 of the enclosure 14 adjacent the rear wall 122 of cover 18 includes an outwardly extending horizontal flange 144 having a tapered end 146 which engages a tapered end 148 of a flange 150 which protrudes outwardly from a sidewall 152 of the lid 22. A conventional hinge 154 has respective flanges secured to the sidewalls 66 and 152 of the enclosure and the lid and pivotally connects the two. When the lid is pivoted in a clockwise direction (as viewed in FIG. 3) the tapered ends 146 and 148 limit the pivotal movement of the lid. The flanges and the tapers are arranged to position the lid slightly inclined from the vertical such that its weight biases the tapered ends of the respective flanges towards each other. The lid is thereby maintained in an open position and does not unintentionally close.

The telephone set is assembled by mounting the feet 48 on the base 16 and securing the receiving and transmitting means 26 to the base. The enclosure 14, including the connecter 78 and pulleys 84 and 88, is slipped over the means 26 and secured to the base 16. The coiled cord 24 is placed into the raceway 68 through the still open cutout 70 which makes the raceway accessible from the exterior at the bottom of the telephone set. An end of the cord is passed through aperture 76 in the vertical wall 72 and suitably secured to terminals (not shown) of the receiving and transmitting means 26. The other end of the cord is passed around pulley 84 on connecter 78 and protrudes past the connecter. Thereafter, the L-shaped bottom plate 52 is suitably secured to the base and the enclosure such that the raceway 68 is fully enclosed and the cord is free to move axially in the raceway and around the peripheries of both pulleys 84 and 88.

Following this the dial 38 is secured to cover 18 is connected with the receiving and transmitting means 26 and the cover, which includes the actuating mechanism 116, is placed adjacent the top 20 of the enclosure and suitably secured thereto. Simultaneously therewith, hinge 154 is secured to the side 66 of the enclosure adjacent the raceway 68 and, preferably, it is secured to the side by the same means, i.e., screws (not shown) with which the cover is secured to the enclosure. Thereafter the mouthpiece 98 is placed onto the cover 18 by first threading the outwardly disposed end of the coiled cord 24 through the tubular portion 102 of the mouthpiece and then placing the mouthpiece through the cutout 96 in the cover such that the recess 106 of the tubular portion 102 engages the recess 108 of the connecter 78. Suitable fasteners (not shown) permanently secure the mouthpiece to the cover. The free end of the coiled cord 24 is now connected with the receiver 28 and the receiver placed onto the cover such that the ear and mouthpieces 32 and 34 are nested in the indentations 30. The lid 22 is secured to the hinge 154 and the telephone set is completely assembled.

The receiver 28 can now be picked off the cover and moved away from the cover. The retracted coiled cord 24 disposed in the raceway 68 is thereby pulled out of the flared outlet 110. The receiver can be removed from the telephone set a distance equal to the maximum distance the coiled cord can be uncoiled and stretched. When the receiver is replaced in the indentations 30 of cover 18, the spring action of the coiled cord retracts the portion of the cord that has previously been removed from the outlet, and therewith from the raceway 68, until the cord, with the exception of that length of cord disposed between the receiver and the outlet, is fully retracted into the outlet and the raceway. The retracting force is solely obtained from the spring tension in the coiled cord. It is not necessary to have auxiliary retracting means, such as spring-wound pulleys as was required in the prior art.

Since the spring force of the cord is relatively small, it is, however, important that frictional forces between the cord and the raceway are minimized. The raceway must therefore be constructed such that it defines a free passageway which at all points is greater than the greatest diameter of the coiled cord. To further this object, it is most desirable to provide sharp bends, such as intermediate the mouthpiece and the raceway and between transverse sections of the raceway, with relatively frictionless pulleys. The pulleys engage and guide the coiled cord and assure a rolling frictional engagement between the cord and the guiding member, that is, the pulley, instead of sliding friction which results in substantially greater forces.

A telephone set constructed in accordance with the present invention is not only esthetically appealing but furthermore prevents damage to loosely hanging coiled telephone cords. In the past, such damage was frequent when persons accidentally became entangled with the loosely hanging telephone cord and thereby pulled it, stretching it beyond its limits or causing the telephone set to fall off its support. Costly damage to both the cord and the telephone set was a consequence thereof. Such accidents are made impossible by a telephone set provided with an interiorly disposed raceway for storing the coiled cord.

The telephone set 12 is installed by securing the connecting cord (not shown), which extends through the aperture 44 in the base 16, to a telephone receptacle box (not shown) disposed on or in a wall of the building. The set is placed on a suitable support, say, a telephone table, and the lid 22 is pivoted counterclockwisely (as viewed in FIG. 3) and closed. The exterior of the lid and the enclosure 14 are preferably provided with ornamental designs (not shown) which enhance the set's esthetic appeal. When the telephone is to be used, the cover is opened until the tapers 146 and 148 of the horizontal flanges 144 and 150 respectively are in engagement. The lid is then maintained in its open position. Thereafter the telephone receiver is picked off the indentations 30, which energizes the receiving and transmitting means 26 and the desired telephone number is dialed on dial 38. Removal of the receiver 28 from the indentations pulls a length of the coiled cord 24 out of the outlet 110. The amount of cord removed from the outlet corresponds to the distance between the outlet and the telephone receiver. The cord, which has an internal spring force, is maintained taut and does not hang loosely about the set.

Upon termination of the telephone call, the receiver 28 is replaced in the indentations 30, whereby the actuating caps 114 are depressed, which in turn depresses, i.e., counterclockwisely pivots, the hinge bar 118 and knife edge 134. The receiving and transmitting means 26 are thereby deenergized and the telephone is disconnected from outside lines.

If the person using the telephone inadvertently replaces the receiver onto the inclined second portion 92 of cover 18, the slope of the second portion of the cover causes a gravitational force acting on the receiver to slide it towards the first portion 90 of the cover. Since the indentations 30 are closely adjacent the inclined portion of the cover, the ear and mouthpieces 32 and 34, respectively, automatically engage the indentations. In contrast to heretofore available telephones, the receiving means 26 are thereby deenergized since nesting of the ear and/or mouthpiece depresses the actuating caps 114. The telephone set thereby remains capable of receiving telephone calls from the outside. In the past the receiver had to be replaced in its proper position on the telephone set in order to enable the set to receive outside calls. The telephone caller had to be careful that the receiver was placed in its proper position. Inadvertent misplacement of the receiver permanently disabled the telephone set from receiving calls until such time as the misplacement of the receiver was noticed and the receiver was placed into its proper position.

The present invention has been described in terms of a preferred embodiment. The spirit and scope of the appended claims should not, necessarily, be limited to the description.

We claim:

1. A telephone set comprising:

a. a base adapted to mount telephone receiving and transmitting means including a retracted length of helically coiled telephone cord having a first end operatively connected with said means;

b. an enclosure on the base including an outlet defining a passage having a smallest diameter greater than the greatest diameter of the coiled cord, the enclosure being adapted to receive dialing means which are operatively connected with the receiving and transmitting means for dialing telephone numbers;

c. a raceway disposed inside the enclosure having a length about equal to the retracted length, the raceway defining a smooth, unobstructed passage for the cord and being joined to the outlet such that the cord is freely pulled out of the raceway through the outlet and automatically under its own spring tension retracts into the raceway upon being released, the raceway being in at least two straight sections disposed at an angle in the order of about 90° to each other, the outlet also being disposed at an angle in the order of about 90° with respect to the section of the raceway it is joined to;

d. a rotatably mounted pulley disposed within the raceway on the inside of the angle at the junction of its two sections;

e. a rotatably mounted pulley disposed at the junction between the raceway and the outlet on the inside of the angle therebetween;

f. a telephone receiver adapted to be secured to a second end of the cord;

g. actuating means for energizing and deenergizing the receiving and transmitting means in response to removing the receiver from and placing it on the enclosure; and h. a lid hingeably secured to the enclosure for covering the receiver, the dialing means and the outlet.

2. Apparatus according to claim 1 wherein the base includes a bottom plate defining a floor of the raceway, the bottom plate being demountably secured to the enclosure such that the raceway is accessible from the exterior of the telephone set.

3. Apparatus according to claim 2 wherein the enclosure includes indentations in its top for nesting the receiver when not in use, the outlet and the dialing means being disposed in a portion of the enclosure adjacent the indentations, the portion being angularly inclined relative to the indentations such that gravity moves the receiver toward the indentations when the receiver is placed on said portion.

4. Apparatus according to claim 3 wherein the actuating means include a pivotally mounted hinge bar disposed adjacent the indentations which is pivoted in response to removing or placing the receiver in the indentations, and an actuator button connected with the hinge bar and defining an edge slidably engaging the switching member of the receiving and transmitting means during pivotal movements of the hinge bar to energize and deenergize the receiving and transmitting means.

5. Apparatus according to claim 4 wherein a passage defined by the outlet is flared from adjacent the raceway to adjacent an exterior end of the outlet such that the coiled cord retracts into the passage when its axis is inclined relative to the axis of the outlet.

6. Apparatus according to claim 5 wherein the outlet is defined by a mouthpiece and including a connecter intermediate the raceway and the mouthpiece, the raceway, the connector and the mouthpiece including mating recessed portions adjacent their joints to frictionally secure them to each other.

7. A telephone set comprising:

a. a base adapted to mount telephone receiving and transmitting means including a retracted length of helically coiled telephone cord having one end connected with said means;

b. an enclosure having sides, a bottom secured to the base and a top spaced apart from the bottom, the enclosure including:

i. an L-shaped raceway accessible from the exterior of the enclosure disposed adjacent a pair of contiguous sides of the enclosure and having a smooth, unobstructed passage for the cord which is greater than a cross section of the coiled telephone cord, the raceway being defined by a pair of contiguous sides of the enclosure, the base, and a pair of walls connected with the enclosure and disposed substantially transverse to the base and a corresponding side of the enclosure respectively; and ii. a telephone cord outlet opening into the raceway at an angle in the order of about 90° with respect thereto and terminating in an outwardly flared mouth adjacent the top such that the coiled cord is freely pulled in and out of the raceway notwithstanding the directional orientation of the cord outside the mouth;

c. a rotatably mounted pulley on the inside corner of the L-shaped raceway to facilitate free movement of the cord in expanding and contracting around this corner;

d. a rotatably mounted pulley on the inside of the angle between the raceway and the outlet to facilitate free movement of the cord in expanding and contracting around this angle;

e. a cover adapted to receive telephone dialing means and connected with the enclosure adjacent the top and provided with indentations adjacent a side of the enclosure remote from the raceway;

f. a telephone receiver adapted to be connected with another end of the cord having:

i. a mouthpiece;

ii. an earpiece; and iii. a handle intermediate the mouthpiece and the earpiece, said pieces having a configuration such that they nest in the indentations to maintain a low silhouette of the telephone set;

g. movable means projecting past an exterior side of the cover, arranged to be engaged by the receiver when the pieces are disposed in the indentations, and operatively connected with the receiving and transmitting means for energizing them in response to removal of the receiver from the indentations and deenergizing them in response to placing the receiver in the indentations; and h. a lid hingeably secured to the enclosure for covering the cover, the receiver and the outlet.

8. Apparatus according to claim 7 wherein the base includes a plate demountably secured to the base adjacent the raceway and the plate defines a portion of the raceway adjacent the base.

9. Apparatus according to claim 7 wherein the cover of the enclosure has a portion adjacent the indentations which is inclined relative to the indentations such that gravity moves the receiver toward the indentations when the receiver is placed on such portion, the axis of the outlet being normal to the plane of the inclined portion of the cover.